United States Patent
Cornelissen et al.

(10) Patent No.: US 6,490,401 B2
(45) Date of Patent: Dec. 3, 2002

(54) DISPLAY DEVICE WITH IMAGE DISPLAY PANEL AND ILLUMINATION SYSTEM

(75) Inventors: Hugo Johan Cornelissen, Eindhoven (NL); Marinus Josephus Jakobus Dona, Eindhoven (NL); Horst Greiner, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 16 days.

(21) Appl. No.: 09/759,034

(22) Filed: Jan. 11, 2001

(65) Prior Publication Data

US 2001/0024561 A1 Sep. 27, 2001

(30) Foreign Application Priority Data

Jan. 14, 2000 (EP) .............................. 00200135

(51) Int. Cl.[7] .................................. G02B 6/10
(52) U.S. Cl. .................. 385/146; 385/901; 385/147; 362/31; 362/559
(58) Field of Search .............. 385/146, 129, 385/147, 901, 50; 362/31, 26, 559, 561; 439/65, 98

(56) References Cited

U.S. PATENT DOCUMENTS

| | | | |
|---|---|---|---|
| 5,729,311 A | * 3/1998 | Broer et al. | 349/65 |
| 5,779,337 A | 7/1998 | Saito et al. | 362/31 |
| 5,845,035 A | * 12/1998 | Wimberger-Friedl | 385/129 |

FOREIGN PATENT DOCUMENTS

| | | |
|---|---|---|
| DE | 3313288 A1 | 10/1984 |
| EP | 0961076 A1 | 12/1999 |

OTHER PUBLICATIONS

"Compact Front Lighting for Reflective Display", SID 96 Applications Digest, pp. 43–46.

* cited by examiner

*Primary Examiner*—Phan T. H. Palmer
(74) *Attorney, Agent, or Firm*—Aaron Waxler

(57) ABSTRACT

In an illumination (or front light) system based on an optical waveguide for e.g. LCD devices, Moiré artefacts due to internal reflections in the optical waveguide are minimized by using microstructures (grooves) which have a curved shape or are pre-arranged at an angle.

7 Claims, 3 Drawing Sheets

DISPLAY DEVICE WITH IMAGE DISPLAY PANEL AND ILLUMINATION SYSTEM

FIELD OF THE INVENTION

The invention relates to a display device comprising an image display panel having a first substrate which is provided with electrodes at the area of pixels, and an illumination system comprising an optical waveguide of an optically transparent material having an exit face facing the image display panel and a plurality of end faces, at least one of said end faces, being an entrance face for light, while light can be coupled into said and face of the optical waveguide.

The image display panel may comprise an electro-optical medium (between two substrates) such as a liquid crystal material or an electrochromic material. It may also be based on electrostatic forces (deformable mirrors).

Such reflective display devices are used in, for example, portable apparatus such as laptop computers, mobile telephones, personal organizers, etc. With a view to saving energy, it is desirable that the light source can be switched off in the case of sufficient ambient light.

The invention also relates to an illumination system for use in such a display device.

BACKGROUND OF THE INVENTION

A display device of the type mentioned above is described in "Compact Front Lighting for Reflective Displays", SD) 96 Applications Digest, pp 4346. This document shows an optical waveguide having a groove structure at the area of a first main face remote from the image display panel. The groove structure is necessary to deflect light rays into the direction of the image display panel. A problem in this case is that Fresnel reflections occur on various surfaces. In the relevant example, light is reflected on the side of the image display panel but also on faces of the underlying image display panel Qolarizers, retardation filters). Together with the groove structure, the light thus reflected gives rise to Moiré effects (artefacts). Such effects also occur in other optical waveguides with regularly spread parallel reflection patterns. These may be optical waveguides having a groove structure at the area of a second main face facing the image display panel. The optical waveguide may also have integrated reflection patterns, for example, when polarizing means are integrated in the optical wavegaide, in which an unpolarized beam from the light source is split up by polarization into two mutually perpendicularly polarized beam components. Such a polarization separation is obtained, for example, by causing the unpolarized beam to be incident on an interface between an area of isotropic material having a refractive index $n_p$ and an area of anisotropic material having refractive indices $n_o$ and $n_e$, in which one of the two indices $n_o$ or $n_e$ is equal or substantially equal to $n_p$. When an unpolarized beam is incident on such an interface, the beam component which does not experience any refractive index difference at the transition between isotropic and anisotropic material is passed in an undeflected form, whereas the other beam component is deflected or reflected.

SUMMARY OF THE INVENTION

It is an object of the present invention to provide a solution to this problem. To this end, a display device (and an optical waveguide) according to the invention is characterized in that the optical waveguide has reflection patterns in the light path, which reflection patterns extend at least partly at an angle to the end face.

The phrase stating that the grooves "extend at least partly at an angle to the end face" does not necessarily exclude the presence of parallel grooves.

A first embodiment of a display device (and an optical waveguide) according to the invention is characterized in that the reflection patterns are curved with respect to the end face. Viewed in a direction parallel to the end face, the reflection patterns may have an iterative pattern, for example, a pattern of corrugations.

A second embodiment of a display device (and an optical waveguide) according to the invention is characterized in that the optical waveguide has a plurality of short reflection patterns which are mutually oriented in an arbitrary and different way.

Such reflection patterns do not only considerably reduce Moiré artefacts caused by the above-mentioned reflections but also Moiré patterns which are caused by interference phenomena due to reflection of light on a regular pattern in the display panel and transmission of light through an optical waveguide having parallel grooves. It is to be noted that EP-A-940 706 provides a solution to the last-mentioned problem (namely, by suitably choosing the mutual spacing between the grooves).

These and other aspects of the invention are apparent from and will be elucidated with reference to the embodiments described hereinafter.

BRIEF DESCRIPTION OF THE DRAWING

In the drawings:

FIG. 2 is a diagrammatic plan view of the optical waveguide used in the device shown in FIG. 1, while

The Figures are diagrammatic and not to scale. Corresponding components generally have the same reference numerals.

DETAILED DESCRIPTION OF THE PRIMARY EMBODIMENT

Figure 1:
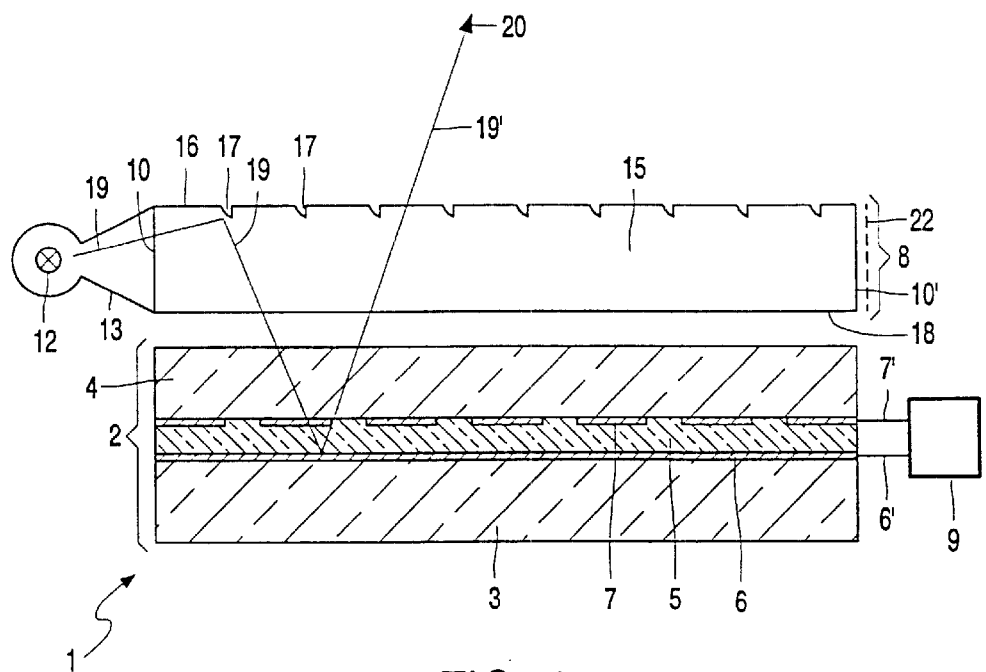
FIG. 1 is a cross-section of an embodiment of a reflective display device according to the invention.
Figure 2:
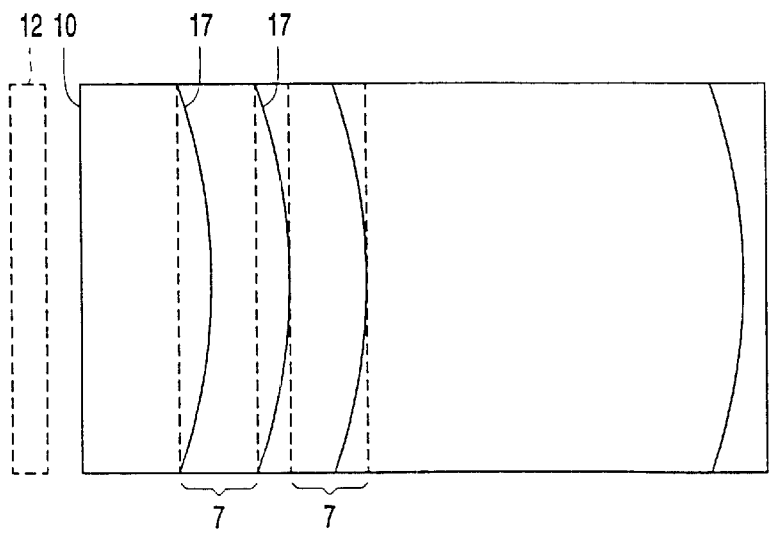

The display device 1 shown diagrammatically in FIGS. 1 and 2 comprises an image display panel 2 and an illumination system 8.

The image display panel 2 comprises a liquid crystalline material 5 between two substrates 3, 4, based on the twisted nematic (TN), the supertwisted nematic (STN) or the ferroelectric effect so as to modulate the direction of polarization of incident light. The image display panel comprises, for example, a matrix of pixels for which light-reflecting picture electrodes 6 are provided on the substrate 3. The substrate 4 is light-transmissive and has one or more light-transmissive electrodes 7 of, for example, ITO (indium tin oxide). The picture electrodes are provided with electric voltages via connection wires 6', 7' which are provided with drive voltages by means of a drive unit 9.

The illumination system 8 comprises an optical waveguide 15 which is made of an optically transparent material and has four end faces 10, 10'. A light source 12 whose light is coupled into the optical waveguide 7 via one of the end faces, for example 10, is situated opposite this end face. The light source 12 may be, for example, a rod-shaped fluorescence lamp. The light source may alternatively be constituted by one or more light-emitting diodes (LED) notably in flat panel display devices having small image display panels such as, for example, portable telephones. Moreover, the light source 12 may be detachable.

The exit face 18 of the optical waveguide 15 faces the image display panel 2. Each end face 10' of the transparent plate in which light is not coupled in may be provided, if necessary, with a reflector 22, notably in the case of a symmetrical shape (viewed in a cross-section) of the grooves. When the grooves have an asymmetrical cross-section, it is advantageous to render the face 10' light-absorbing. in this way, light which is not coupled out on an exit face 16, 18 and consequently propagates through the optical waveguide and arrives at an end face is thus prevented from leaving the optical waveguide 8 via this end face 10'.

To prevent light from leaving the optical waveguide 8 without contributing to the light output of the illumination system, light of the lamp 12 is preferably coupled into the optical waveguide 8 via coupling means 13, for example, by means of a wedge-shaped optical waveguide which limits the angle of the entering beam 19 with respect to the exit faces 16, 18 to, for example, 15 degrees. Moreover, the contrast is enhanced because there is no stray light.

In this embodiment, the optical waveguide 8 has a plurality of grooves 17 on the exit face 16. The entering light beam 19 is thereby reflected in the direction of the image display panel 2.

After reflection in the image display panel 2, the beam 19' is propagated through the optical waveguide (refraction due to differences in refractive indices are considered to be negligible in this embodiment) and reaches the viewer 20.

According to the invention, the grooves (or reflection patterns) 17 extend at least partly at an angle to the end face 10. In the embodiments of FIGS. 1 and 2, these grooves have a curved structure. It is thereby achieved that Moiré patterns due to Fresnel reflections are substantially negligible. Since the grooves 17 also extend at an angle to the electrode paths 7 (and to other, parallel patterns in the display device 2) Moiré patterns caused by interference are also reduced considerably. For the sake of completeness, the position of the lamp 12 is shown diagrammatically in the plan view of FIG. 2.

Figure 3:
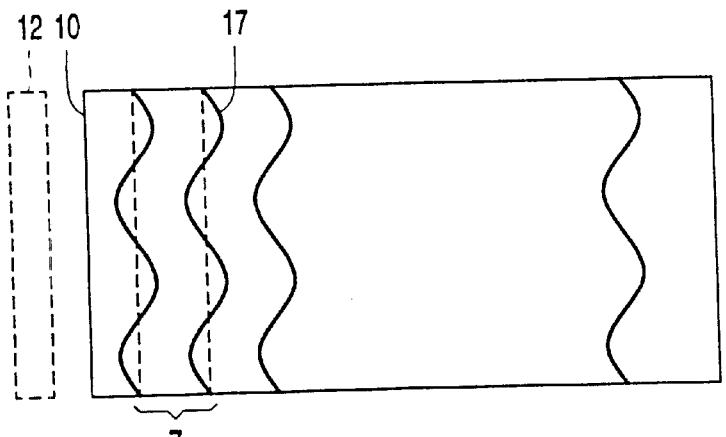
FIGS. 3 to 5 are diagrammatic plan views of variants of the optical waveguide shown in FIGS. 1, 2, and FIGS. 6 to 10 are diagrammatic cross-sections of variants of the optical waveguide shown in FIGS. 1, 2.

In the device shown in FIG. 3, the curved structure is periodically iterated. The reference numerals in this Figure denote the same components as those in FIG. 2.

Figure 4:
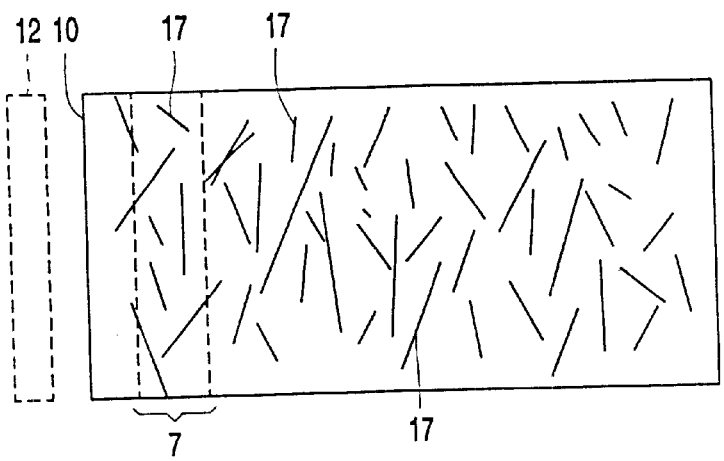

In the device of FIG. 4, the groove structure has a plurality of grooves 17 which have different lengths and extend at different angles to the end face 10 (both the lengths and the angles are chosen at random within the limitations imposed by the dimensions of the optical waveguide and the maximum angle with respect to the end face 10).

Figure 5:
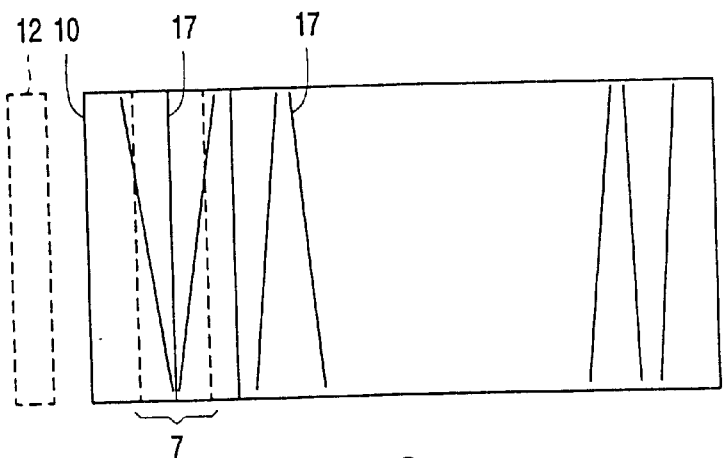
Figure 6:
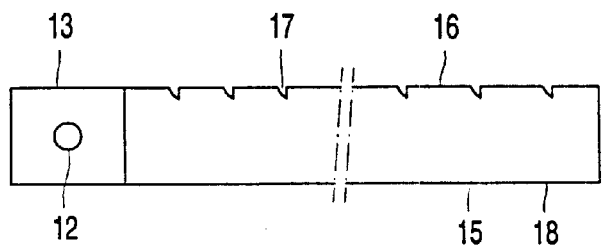

In the device of FIG. 5, the groove structure has a plurality of grooves 17, with different angles with respect to the end face 10 (the angles are chosen at random again within the limitations imposed by the maximum angle with respect to the end face 10). The grooves now extend substantially throughout the width (or, if necessary, the length in a 90° rotated arrangement) of the optical waveguide. In FIGS. 5 and 6, grooves may also occur which extend parallel to the end face 10. The phrase stating that the grooves "extend at least partly at an angle to the end face" does not exclude such parallel extending grooves. The reference numerals again denote the same components as those in FIG. 2.

To sufficiently utilize light 19 at a grazing incidence, coming from the light source 12 after refraction on the end face 10, the angle between the grooves and this face 10 is preferably smaller than a given maximum. This maximum also depends on the refractive index of the material used for the optical waveguide. When PMMA (polymethyl methacrylate) is used, the angle will be preferably chosen to be smaller than 48 degrees, and smaller than 50 degrees when polycarbonate is used.

Figure 7:
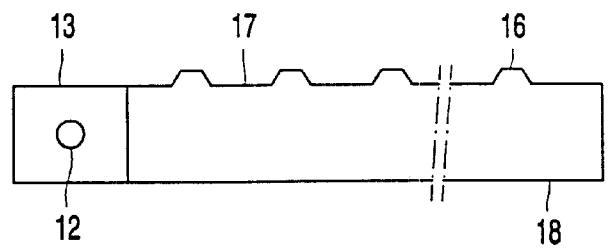
Figure 8:
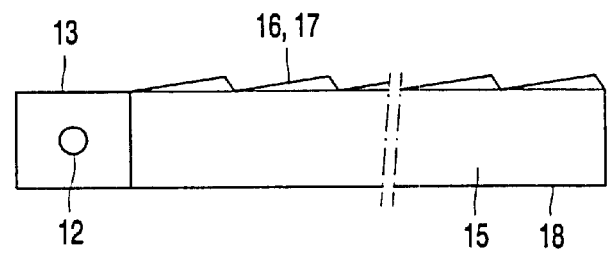

The groove structure may be realized in various ways. FIG. 6 shows a structure with narrow grooves 17, while the structure of FIG. 7 has relatively wide grooves 17. In the device of FIG. 8, the groove pattern 17 is obtained by giving the exit face 16, viewed in a cross-section, a sawtooth shape.

Figure 9:
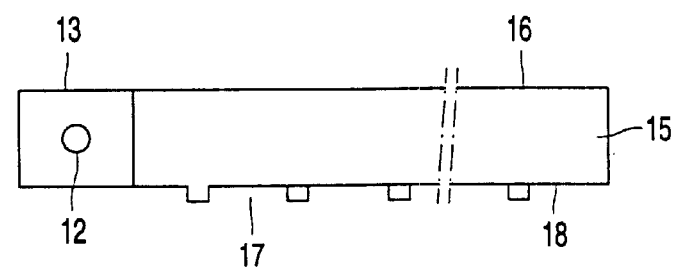

Several variations are possible within the scope of the invention. For example, the groove pattern 17 may alternatively be present on the exit face 16 of the optical waveguide 15 facing the image display panel 2 (FIG. 9).

The picture electrodes 6 do not need to be light-reflecting. In another embodiment, they are used as light-transmissive ITO electrodes and a mirror is arranged behind these electrodes.

Figure 10:
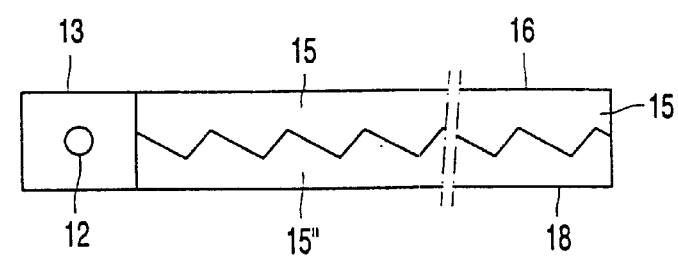

In another embodiment, the optical waveguide is based on polarization separation on the interface between two materials (15', 15") having different refractive indices, in which the refractive index in both materials is the same for one beam component, while there is a difference in refractive index for the other beam component (FIG. 10). Viewed in a plan view, the reflection patterns then again extend in accordance with one of the embodiments shown in FIGS. 2 to 5.

The protective scope of the invention is not limited to the embodiments described. As mentioned in the opening paragraph the display device may be based on an electrochromic material or on deformable mirrors as well. The invention resides in each and every novel characteristic feature and each and every combination of characteristic features. Reference numerals in the claims do not limit their protective scope. Use of the verb "comprise" and its conjugations does not exclude the presence of elements other than those mentioned in the claims. Use of the article "a" or "an" preceding an element does not exclude the presence of a plurality of such elements.

What is claimed is:

1. A display device comprising an image display panel having a first Bubstrate which is provided with electrodes at the area of pixels, and an illumination system comprising an optical waveguide of an optically transparent material having an exit face facing the image display panel and a plurality of end faces, at least one of said end faces being an entrance face for light, while light can be coupled into said end face of the optical waveguide, characterized in that the optical waveguide has reflection patterns in the light path, which reflection patterns extend at least partly at an angle to the end face, and wherein the reflection patterns exist on one of said end faces or on a face opposite the exit face.

2. A display device as claimed in claim 1, characterized in that the image display panel has a second light-transmissive substrate and an electro-optical material between the two substrates.

3. A display device as claimed in claim 1 or 2, characterized in that the reflection patterns are curved with respect to the end face.

4. A display device as claimed in claim 3, characterized in that, viewed in a direction parallel to the end face, the reflection patterns have an iterative pattern.

5. A display device as claimed in claim 1 or 2, characterized in that the optical waveguide has a plurality of short reflection patterns which are mutually oriented in an arbitrary and different way.

6. A display device as claimed in claim 1 or 2, characterized in that the angle with respect to the end face is at most 50 degrees.

7. A display device as claimed in claim 1 or 2, characterized in that the reflection patterns have groove patterns on a main face of the optical waveguide.

* * * * *